United States Patent
Freeze

(10) Patent No.: US 9,854,142 B2
(45) Date of Patent: Dec. 26, 2017

(54) SECURITY DOOR FOR ELECTRONIC COMMUNICATION DEVICES

(71) Applicant: Andrew J. Freeze, Butler, PA (US)

(72) Inventor: Andrew J. Freeze, Butler, PA (US)

(*) Notice: Subject to any disclaimer, the term of this patent is extended or adjusted under 35 U.S.C. 154(b) by 254 days.

(21) Appl. No.: 14/708,722

(22) Filed: May 11, 2015

(65) Prior Publication Data
US 2016/0088264 A1    Mar. 24, 2016

Related U.S. Application Data

(60) Provisional application No. 62/052,500, filed on Sep. 19, 2014.

(51) Int. Cl.
*H04N 7/18* (2006.01)
*H04N 5/225* (2006.01)

(52) U.S. Cl.
CPC ......... *H04N 5/2254* (2013.01); *H04N 5/2252* (2013.01)

(58) Field of Classification Search
CPC .............. G03N 17/00; E05C 1/08; E05C 5/02
USPC .................................. 348/142–160
See application file for complete search history.

(56) References Cited

U.S. PATENT DOCUMENTS

| | | | |
|---|---|---|---|
| 7,581,893 B2 | 9/2009 | Miramontes | |
| D606,039 S * | 12/2009 | Henning | D14/138 AA |
| 8,023,040 B2 | 9/2011 | Zhou | |
| 8,137,009 B2 | 3/2012 | Cirker | |
| 8,242,924 B2 | 8/2012 | Huang et al. | |
| 8,496,390 B2 | 7/2013 | Ohuchi et al. | |
| 8,724,020 B1 | 5/2014 | Haddad | |
| 8,902,318 B1 | 12/2014 | Haddad et al. | |
| 9,124,792 B2 | 9/2015 | Barangan et al. | |
| 2005/0225668 A1 | 10/2005 | Kim | |
| 2006/0077287 A1 * | 4/2006 | Koshu | G09F 3/0292 348/376 |
| 2008/0273117 A1 | 11/2008 | Nilsson | |

(Continued)

FOREIGN PATENT DOCUMENTS

| | | |
|---|---|---|
| CN | 201084239 Y | 7/2008 |
| CN | 202696707 U | 1/2013 |
| DE | 10315331 A1 | 8/2003 |

OTHER PUBLICATIONS

Online article found at http://cameras.reviewed.com/features/how-your-smartphone-camera-can-be-used-to-spy-on-you, May 6, 2015.

(Continued)

*Primary Examiner* — Andy Rao
(74) *Attorney, Agent, or Firm* — Karen Tang-Wai Sutton

(57) ABSTRACT

A security door (100) for a communication device used to record and store or transmit visual data, the communication device having a lens (40) for an integrated camera positioned in an aperture (28) cut into a shell (24) of the visual communication device, the security door slideably affixed to the shell by a channel (52) affixed to an inner side (26*b*) of the shell, allowing a user to physically slide the door over the aperture to cover or uncover the lens, as desired, such covering and uncovering of the lens independent of camera function. In another embodiment, software is used to open and close the door. In some embodiments, the security door is disposed as a pocket door slideably moving inside a pocket door frame.

13 Claims, 4 Drawing Sheets

(56) References Cited

U.S. PATENT DOCUMENTS

2009/0252487 A1* 10/2009 Matsumoto ......... H04M 1/0237
396/448
2011/0058255 A1  3/2011 Weiss
2013/0050549 A1  2/2013 Bilbrey
2013/0222609 A1  8/2013 Soffer
2014/0119718 A1  5/2014 Oh et al.

OTHER PUBLICATIONS

Webpage of Norton Security advertising security products that allow smartphone owners to remotely direct communication device camera to take stealth photos of an alleged thief handing the communication device https://mobilesecurity.norton.com/.

* cited by examiner

SECURITY DOOR FOR ELECTRONIC COMMUNICATION DEVICES

CROSS REFERENCE TO RELATED APPLICATIONS

Reference is made to and priority claimed from U.S. provisional application Ser. No. 62/052,500 filed on 19 Sep. 2014.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION BY REFERENCE OF MATERIAL SUBMITTED ON A COMPACT DISC OR AS A TEXT FILE VIA THE EFS WEB SYSTEM

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention pertains to the field of securing data stored in a variety of electronic communication devices, such as smartphones, tablets, and laptop computers, from inadvertent or deliberate unauthorized access. More particularly, the present invention is a physical security door that can be manually or automatically closed over a camera lens of a camera integrated into the electronic communication device.

Background Art

Most smartphones, tablets, laptop computers, MP3 players, and other electronic communication devices are visual communication devices, devices that have integrated cameras record and transmit visual data. The camera's lens is positioned either on the front face of the device, such as in the case with most laptop computers, where the camera lens is located along the monitor, facing the user, while in the case of tablets and smartphones, the camera lens is most often positioned so as to be rear-facing, with the camera lens aperture located along a back side of the device's shell or case. In all cases, the lens is either flush with the device's case or shell, or slightly recessed, but the camera's lens never has a physical cover.

In the prior art, a physical cover for a camera's lens is well known and its purpose is to protect the delicate lens from damage when the camera is not in use, such as scratches, which might otherwise result in poor quality photographs. The lens cover is removed only to allow pictures to be taken, and then replaced, the removing and replacing done either manually or automatically, to protect the lens while not in active use. In visual communication devices, however, the integrated camera and its lens are well protected by the design of the device, hence no physical cover is included or even deemed necessary because the lens area is generally impervious to damage, etc. during ordinary use of the communication device.

Unfortunately, electronic communication devices are controlled by software and their wireless connection to the world entices hackers and other miscreants to spy on the device user by remotely activating the device's own camera and transmit unauthorized video and pictures. A recent NSA scandal involving contractor Edward Snowden highlighted troubling information about a secret NSA program designed to hijack Apple's iPhone cameras, allowing the NSA to remotely activate the phone's camera and thus monitor the user. Coupled with the fact that many who use electronic communication devices sometimes don't realize their cameras are recording, for instance, by mistakenly thinking that a dark power saving screen on a smartphone means the camera is also off, the inclusion of an integrated camera has become a source of anxiety for many users. For instance, Symantec Corporation of Mountain View, Calif. sells a well-known security software Norton Security and Backup that allows users to remotely lock their devices so that in the event the device is lost or stolen, an unauthorized user cannot gain access to the data stored on the device. Further, the device, when turned on, will take pictures of the user, giving the real owner a snapshot of a potential thief or the location of the thief, but without the thief's knowledge that photos are being secretly taken. Companies who issue company-owned wireless communication devices often permanently disable the camera so as to avoid spying or mistaken transmission of sensitive information, even though they acknowledge the lack of the camera functionality is inconvenient.

What is needed is a physical security door for a visual communication device that can be conveniently opened or closed, manually or automatically, as desired by a user, and whose position, either open or closed is independent of the functioning of the camera.

BRIEF SUMMARY OF THE INVENTION

Accordingly, in a first aspect of the invention, a security door is provided for a visual communication device having an integrated camera with a camera lens positioned in an aperture of the communication device shell, the security door having an outer face with grasping means formed on the outer face, and a door latch side with a door latch side mating means formed thereon, wherein the shell is formed with a shell first side mating means adapted to receive the door latch side mating means. The security door is slideably mounted to the shell by at least one channel affixed to the shell on one side of the aperture so as to be oriented perpendicular to the sliding motion of the security door, whereby the security door slideably covers and uncovers the aperture, and the door latch side mating means mates with the shell first side mating means when the security door uncovers the aperture.

In a second aspect of the invention, the shell is further provided with one or more channels positioned on opposing sides of the aperture and oriented perpendicular to a sliding direction of the security door. A length of the one or more channels is longer than a length of the aperture. The channels may also be adapted along with an inner shell side of the shell to form a pocket door frame that slideably receives the security door, and the security door formed as a pocket door maintains a portion of the security door inside the pocket door frame at all times as it slideably engages the pocket door frame.

In yet a third aspect of the invention, the security door is further comprised of a door first side mating means positioned at the door first side that is sized and shaped to receive a shell first side mating means to lock the security door in a closed position.

In still a fourth aspect of the invention, the security door is made of a flexible plastic with a textured grasping means formed on an outer side of the security door, or alternatively, with a raised finger hold.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
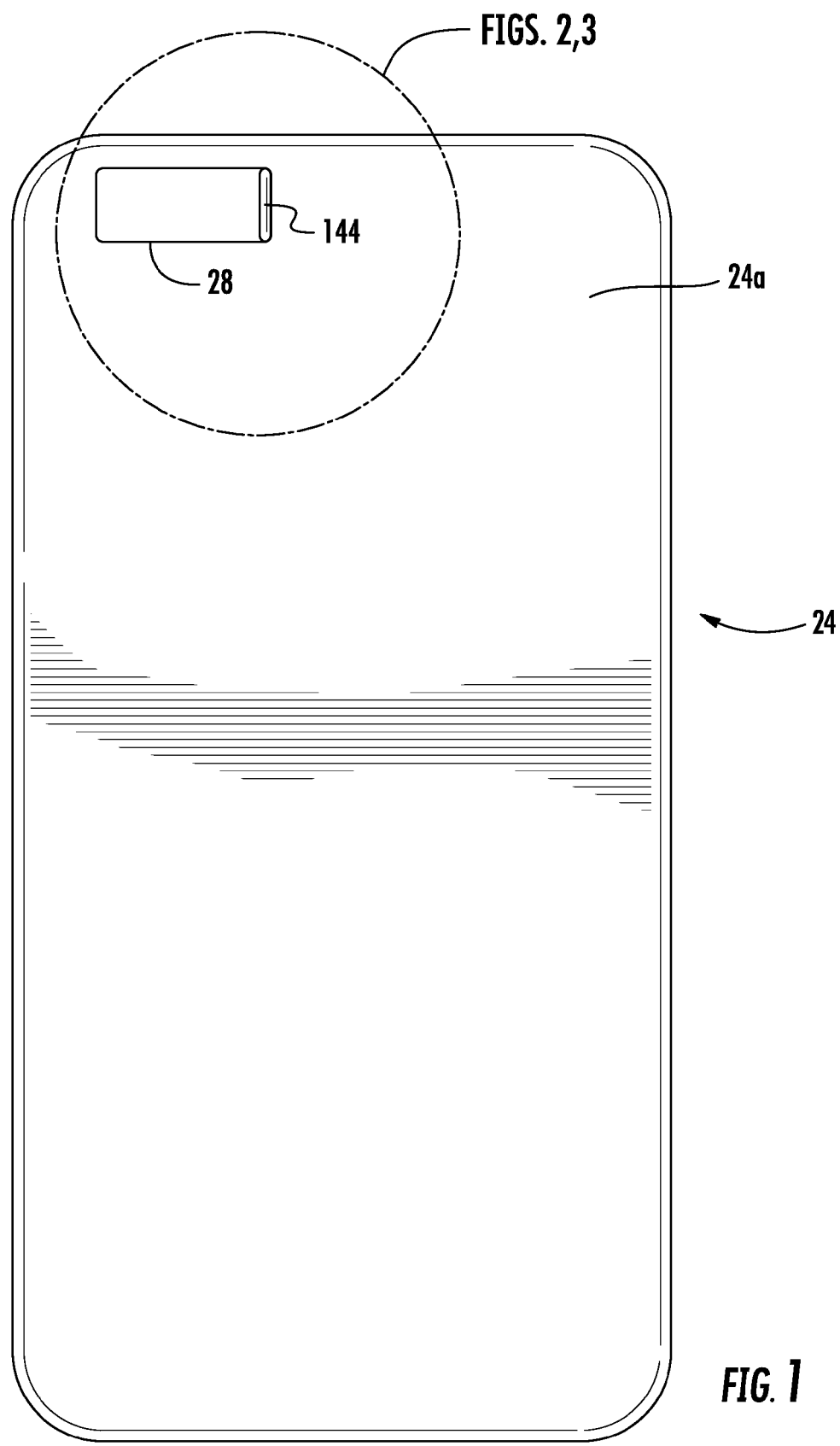
FIG. 1 is a plan view of a back side of a shell of a representative visual communication device and an aperture formed into the shell through which a lens of a camera (not shown) included in the communication device would appear, and shown with a security door according to the invention, the security door shown in an open position.
Figure 2:
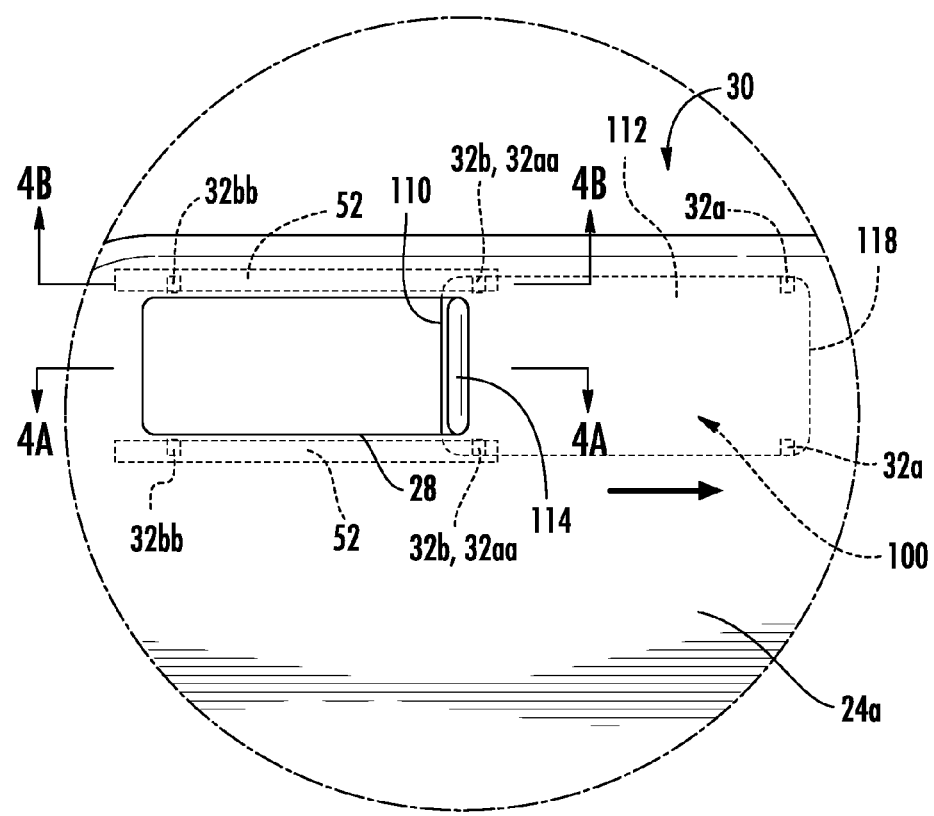
FIG. 2 is a detail view of the security door of FIG. 1, the security door shown in an open position.

The following is a list of reference labels used in the drawings to label components of different embodiments of the invention, and the names of the indicated components.

24 visual communication device shell
26a outer side of the shell
26b inner side of the shell
26c pocket door inner wall
28 cutout or aperture for a camera lens
30 open position of door
32a door first side mating means
32aa shell first side mating means
32b door latch side mating means
32bb shell latch side mating means
34 closed position of door
52 channel
100 security door
110 door latch side
112 outer face of security door
114 grasping means
118 door first side

GLOSSARY OF TERMS

Aperture: a cutout in the housing or shell of a communication device allowing the lens of an integrated camera access to data outside of the communication device shell. The aperture is covered by a transparent covering protecting the lens, and use of aperture is meant to indicate a space for the camera lens.

Communication device or Visual communication device: an electronic device, including cellphones, tablets, laptop computers, MP3 players, etc., having an integrated camera with an ability to capture and store or transmit visual data, and includes communication devices that are mobile and wireless, such as smartphones, and also those that are generally fixed or stationary, such as security devices with cameras that are mounted to a wall or ceiling, whether wireless or wired.

Shell: a communication device exterior housing, including a removable protective case and a permanent, non-removable housing.

DETAILED DESCRIPTION OF THE INVENTION

A security door 100 adapted to cover and uncover a lens of an integrated camera housed in a communication device is shown in the Figures. The security door 100 in a typical embodiment is comprised of a thin, flexible, opaque material, such as plastic, slideably mounted to a shell 24 of the communication device. The security door 100 is positioned so as to slideably cover and uncover a cutout or aperture 28 in the shell, inside which the lens of the integrated camera is located. The aperture 28 itself is typically covered by a transparent material to protect the lens from damage and still allow operation of the integrated camera, and the transparent cover is typically recessed into the aperture 28 to avoid scratches or other damage to the transparent cover that might otherwise affect picture quality.

In a typical embodiment, the security door 100 is slideably secured to an inner side 26b of the shell 24 by at least one channel 52 or a pair of parallel, spaced apart channels 52, each channel 52 of the pair positioned on opposed sides of the aperture 28. It should be noted that in the Figures, the channels 52 appear on an upper side and a lower side of the aperture 28, while the security door 100 slides horizontally across the aperture, riding inside and sandwiched between the channels 52, but the channels can also be configured so as to allow the security door to slide in a vertical plane. When a single channel 52 is used, the channel opening slideably receiving the security door is positioned along either the upper or the lower side of the aperture, typically perpendicular to the sliding movement of the security door 100. The channels 52, as shown in the Figures, span the length of the aperture 28 and an additional length on a door latch side 110 for stability of door movement. The entire channel length allows the security door 100 to slideably cover and uncover the entire aperture surface. The inventor notes that in the Figures, the additional channel length could also be located on a door first side 118, opposite the door latch side 110 and the location of the additional channel length is dependent on the location of the aperture 28 itself on the shell 24, particularly the amount of available room on either side of the aperture 28 sufficient to accommodate movement of the security door. The inventor notes that the lenses of many integrated cameras are located in an upper corner or along a top edge of the shell 24, and in those circumstances, the channels 52 and security door 100 positions must be adapted so as to use available space along the shell 24 as required. The position of the security door and channels in the Figures hence are not meant to limit the channel 52 or door positioning as moving the door from left to right to close the security door, but is simply an illustration of a typical embodiment suitable when sufficient space exists along the proximal side of the aperture.

In some embodiments, the security door 100 is disposed as a pocket door sliding inside a pocket door frame formed by lengthening an innermost side of the channels 52 (i.e. a side closest to the camera of the communication device) so that the channels 52 are connected to one another on the innermost side and so as to create a gap between the shell inner wall 26b and the lengthened channel 52, which is now serving as a second inner wall. The gap is adapted to slideably receive the security door 100. In this embodiment, the security door 100 itself is lengthened and the channels modified to create a pocket, and a portion of the lengthened security door always remains inside the pocket door frame and is simply extended when the door is closed over the aperture 28.

The inventor is concerned about the inadvertent use of the integrated camera, and hence maintaining an open position 30 or a closed position 34 for the security door is of great importance. Along with the door latch side 110, the security door 100 is further comprised of an outer face 112, with grasping means 114 formed along the outer face 112. In some embodiments, as shown in the Figures, grasping means 114 are formed along the door latch side 110, although the inventor notes that grasping means may also be formed along at least half of a surface area of the outer face 112. Grasping means 114 allow a user to grip the security door 100 with a finger to physically move the security door 100 into the open position 30 or the closed position 34. Suitable grasping means 114 include reeding, or some other suitable textured surface pattern formed into the outer face 112, or in other embodiments, maybe disposed as raised lip or finger grip located at the latch side, or any other suitable position along the surface area of the outer face 112. The Figures show both a raised finger hold and a texturized design.

The security door 100 is further comprised of mating means formed on the outer face 112 of the security door 100, with a door first side mating means 32a formed at the door first side 118, and a door latch side mating means 32b formed at the door latch side 110. The inventor notes that the door latch side mating means 32b may be incorporated or integrated into the grasping means 114 at the latch side 110.

Figure 3:
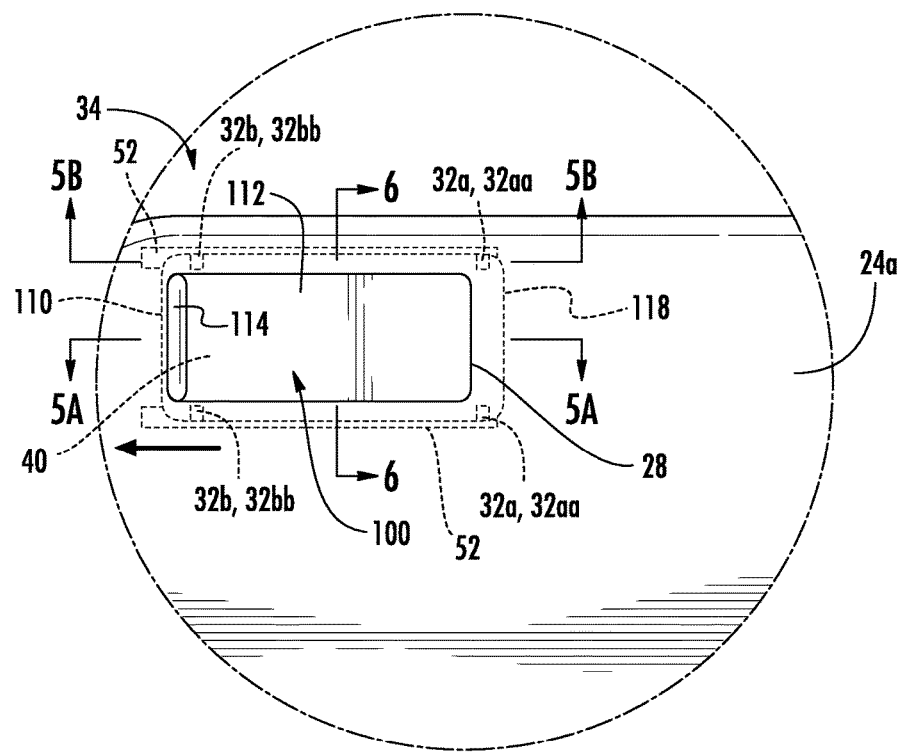
FIG. 3 is a detail view of the security door of FIG. 1, shown in a closed position, showing the door engaging a pair of channels affixed to an inner side of the communication device shell and covering the aperture.
Figure 4A:
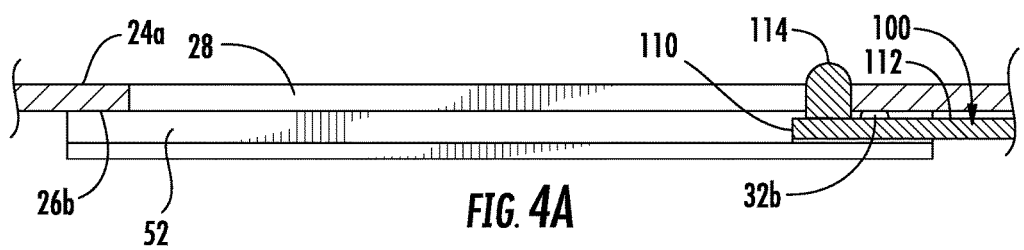
FIG. 4A is a sectional view taken along section lines 4A-4A in FIG. 2, showing the security door in the open position as it engages the channel.
Figure 4B:
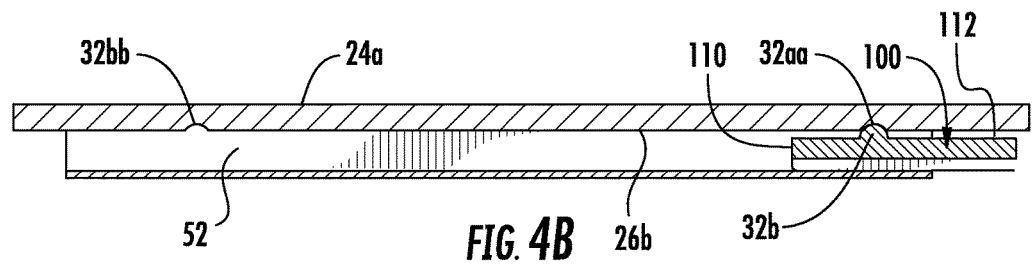
FIG. 4B is a sectional view taken along section lines 4B-4B though the channels in FIG. 2, showing the security door locked into the open position.
Figure 5A:
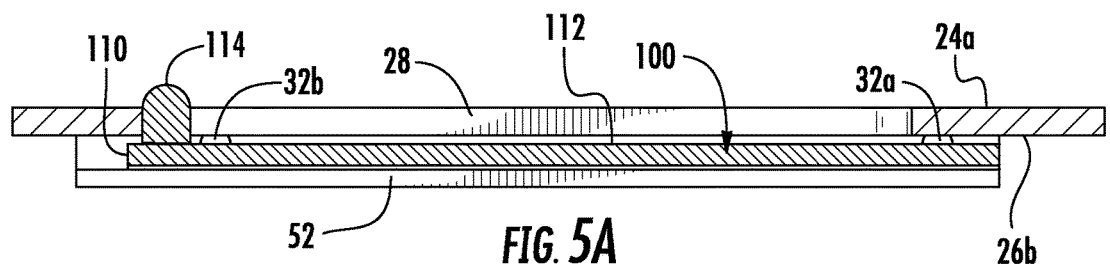
FIG. 5A is a sectional view taken along section lines 5A-5A in FIG. 3, showing the security door in the closed position as it engages the channel.
Figure 5B:
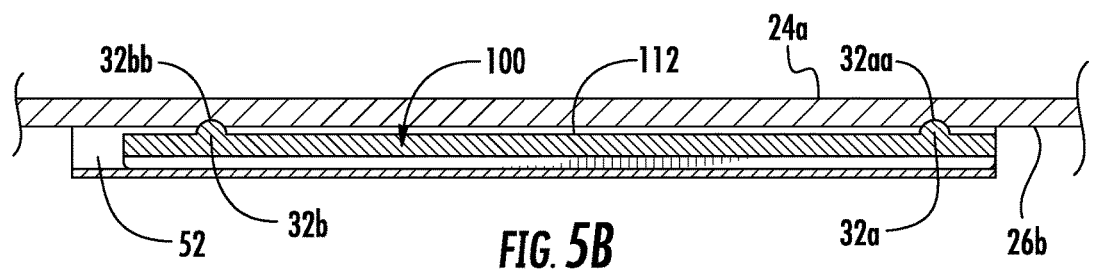
FIG. 5B is a sectional view taken along section lines 5B-5B through the channel in FIG. 3, showing the locking of the security door into the closed position.
Figure 6:
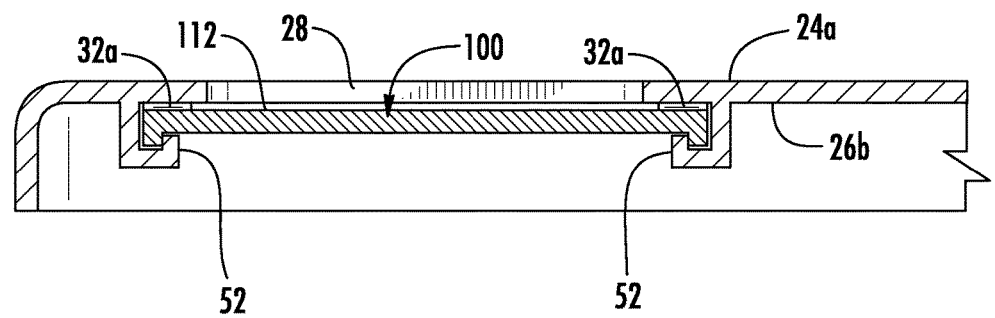
FIG. 6 is a sectional view taken along section lines 6-6 in FIG. 3, showing the configuration of the channels and the security door engaging those channels.

In the embodiment shown in FIGS. 3 and 5A-5B, to position the security door 100 in a closed position 34, the door is slid over the aperture 28. To maintain this closed position 34, a shell second mating means 32bb disposed as a mating groove on an inner side 26b of the shell receives the second mating means 32b located at the door latch side 110. Additionally, and at a same time, at the door first side 118, the door first side mating means 32a mates with a shell first mating means 32aa.

When the security door 100 is slid into the open position 30, uncovering the aperture 28, the door latch side mating means 32b on the latch side 110 of the security door mates with the shell first side mating means 32aa. In the Figures, the mating structures 32a 32aa 32b 32bb are shown with as a complementary groove and ridge combination, but other suitable mating systems relying on pressure can be substituted, such as tabs. The inventor notes that when the security door is a pocket door, the shell second mating means 32bb may be eliminated entirely, and maintaining the open 30 or closed 34 position is achieved by the shell first side mating means 32aa receiving the respective door mating means 32a 32b. The mating structures ensure that the security door 100 stays in the open 30 or closed positions 34 and will not inadvertently change position when the communication device is turned or slipped inside a pocket or purse, as is common during ordinary use.

The inventor notes that the security door 100 typically will be opened or closed with a physical push from the user's finger, however in another embodiment, the door can be adapted to be automatically opened or closed by software that opens and closes the door 100 independent of camera operation. Normally, in the prior art, automatic removal and replacement of a lens cover is done according to the use status of the camera: if the camera is inactive, the cover shuts over the lens. The inventor believes there are times when it is more convenient to leave the camera function running but optimal to close the security door 100 and prevent the camera from recording images, even with an automatic door opening/closing system. Such would be the case when a series of pictures are to be taken, and time is needed between camera shots to arrange the image. For a traditional film camera, nothing is happening between camera shots, but for a digital camera, the camera lens images everything, and it is conceivable that the images received through the lens are being surreptitiously recorded. Digital cameras respond more slowly when activated/inactivated, thus turning the camera on and off between shots to avoid unwanted photographs or recordings is generally too time consuming and cumbersome when a series of shots are to be taken with a relatively short time lapse between shots.

The inventor also specifically notes that the security door 100 is also adapted to be used with a variety of security systems having an integrated camera or some other type of visual data capturing and storing/transmitting ability. The camera and its lens in this embodiment would be housed in a structure that would allow the inventor's security door to slideably open and close over the camera lens.

Numerous other modifications and alternative arrangements may be devised by those skilled in the art without departing from the scope of the present invention. For instance, while the Figures show a single door, it is also possible to configure a bipartite door that opens in the middle, either horizontally or vertically, by scrolling a tab up and down along one side of the aperture 28, and this configuration, while not shown in the Figures, is equally relevant and another embodiment of the invention. The configuration of the door is one in which the door is slideably arranged about the aperture 28, and whether the door is a single piece or two or more pieces that slide over or away from the aperture 28 are just other embodiments of the inventor's security door. Additionally, the inventor notes that the shell mating means could also be located along one or both channels 52 instead of along the inner side of the shell.

What is claimed is:

1. A security door (100) for a shell (24) of a communication device having an integrated camera with a camera lens, the camera lens positioned in an aperture (28) formed in the shell, the security door comprising:
    an outer face (112) having a door first side (118) and an opposed door latch side (110); and
    a door latch side mating means (32b) formed on the outer face (112) on the door latch side (110);

wherein the shell (24) is formed with a shell first side mating means (32aa) adapted to receive the door latch side mating means (32b); and wherein the security door (100) is slideably mounted to the shell (24) so as to independently slideably cover and uncover the aperture (28) from operation of the integrated camera;

whereby the door latch side mating means (32b) mates with the shell first side mating means (32aa) when the security door (100) uncovers the aperture (28).

2. The security door (100) of claim 1, further comprising a channel (52) positioned along a side of the aperture (28) perpendicular to a sliding direction of the security door.

3. The security door (100) of claim 2, wherein a channel length of a predetermined length is longer than a predetermined length of the aperture (28).

4. The security door (100) of claim 2, further comprising a second channel (52) positioned in parallel, spaced apart relationship with the channel on an opposing side of the aperture (28), whereby the security door (100) slideably engages the channels to cover and uncover the aperture 28.

5. The security door (100) of claim 4, wherein the shell (24) is further comprised of an inner shell side (26b) and wherein the channels (52) and inner side shell wall (26b) form a pocket door frame sized and shaped to slideably receive the security door (100).

6. The security door (100) of claim 1, wherein the security door further comprises a door first side mating means (32a) positioned at the door first side (118), the door first side mating means sized and shaped to receive the shell first side mating means (32aa).

7. The security door (100) of claim 1, wherein the security door is made of flexible plastic.

8. The security door (100) of claim 1, wherein the shell (24) is a removable external case for a communication device.

9. The security door (100) of claim 8, wherein the communication device is a security camera.

10. The security door (100) of claim 1, further comprising software controlling opening and closing the door.

11. A security door (100) for a shell (24) of a communication device having an integrated camera with a camera lens, the camera lens positioned in an aperture (28) formed in the shell, the security door comprising:

at least two door portions slideably mounted to the shell (24), each door portion sized and shaped to slideably cover and uncover a predetermined portion of the aperture (28);

wherein the at least two door portions, when in a closed position, together collectively cover the aperture (28); and wherein the at least two door portions, when in an open position, together collectively uncover the aperture.

12. The security door (100) of claim 11, further comprising software controlling opening and closing of the at least two door portions.

13. The security door (100) of claim 11, wherein the shell (24) further comprises at least one channel (52) per door portion, each door portion slideably engaging the at least one channel.

* * * * *